(12) United States Patent
Herley et al.

(10) Patent No.: US 6,976,166 B2
(45) Date of Patent: Dec. 13, 2005

(54) METHOD AND APPARATUS FOR PARTIAL ENCRYPTION OF CONTENT

(75) Inventors: Cormac Herley, Los Gatos, CA (US); Yihong Xu, Marlborough, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 754 days.

(21) Appl. No.: 09/776,680

(22) Filed: Feb. 6, 2001

(65) Prior Publication Data

US 2002/0108035 A1 Aug. 8, 2002

(51) Int. Cl.[7] .............................................. H04L 9/00
(52) U.S. Cl. .................. 713/165; 713/189; 380/54; 380/200; 380/201; 726/31; 726/32; 705/50; 705/51
(58) Field of Search .............................. 705/50, 51–54; 380/54, 200, 201; 713/200, 165, 189; 726/31, 726/32

(56) References Cited

U.S. PATENT DOCUMENTS

| | | | |
|---|---|---|---|
| 4,200,770 A | | 4/1980 | Hellman et al. |
| 4,405,829 A | | 9/1983 | Rivest et al. |
| 5,598,470 A | * | 1/1997 | Cooper et al. ............... 713/165 |
| 5,933,498 A | * | 8/1999 | Schneck et al. ............... 705/54 |
| 5,933,499 A | * | 8/1999 | Enari ......................... 380/217 |
| 5,999,622 A | * | 12/1999 | Yasukawa et al. ............ 705/51 |
| 6,449,718 B1 | * | 9/2002 | Rucklidge et al. ........... 713/168 |
| 6,456,985 B1 | * | 9/2002 | Ohtsuka ....................... 705/51 |
| 6,904,415 B2 | * | 6/2005 | Krahn et al. .................. 705/50 |
| 6,931,534 B1 | * | 8/2005 | Jandel et al. ................ 713/176 |

FOREIGN PATENT DOCUMENTS

| | | | | |
|---|---|---|---|---|
| EP | 0 614 308 A1 | * | 9/1994 | ............ H04N 1/44 |
| FR | 2812147 A | | 1/2002 | |
| WO | WO9938302 A | | 7/1999 | |
| WO | WO0049597 A | | 8/2000 | |

* cited by examiner

Primary Examiner—Kim Vu
Assistant Examiner—Beemnet W Dada

(57) ABSTRACT

The present invention is directed to methods and apparatus that partially encrypt an information data file. An exemplary method includes dividing the information file into a first file and a second file, wherein the second file includes content from the information file to preclude reconstruction of the information file using only the first file, and encrypting the second file. Additionally, the method provides for transmitting the first file and the encrypted second file from a first device to a second device.

13 Claims, 4 Drawing Sheets

METHOD AND APPARATUS FOR PARTIAL ENCRYPTION OF CONTENT

BACKGROUND OF THE INVENTION

1. Field of the Invention

The present invention relates to communication systems, and in particular to encrypting of information for transmission in a communication system.

2. Background Information

Secure transmission of information is of concern when transferring content over a public network such as the Internet. In some cases, an additional concern is to ensure that the recipient, or anyone who intercepts the information, is not able to forward the information to others. For example, a vendor of content such as digitized music may sell the content in a form readily playable on any personal computer. A recipient of the content could deprive the vendor of revenue by forwarding the content to others, or by posting the content in a file on a server for unlimited access by others.

The vendor can, of course, encrypt the content to protect against the content being intercepted by an unintended recipient. Many encryption systems and protocols exist to secure electronic transmission between a vendor and a customer. For example, Pretty Good Privacy (PGP) is a public domain encryption system that uses public/private key protocols such as Diffie-Hellman, as disclosed in U.S. Pat. No. 4,200,770, and Rivest-Shamir-Adleman (RSA), as disclosed in U.S. Pat. No. 4,405,829, the disclosures of which are hereby incorporated by reference in their entirety.

In addition to encrypting information for secure transmission, public/private key systems have been developed to protect against an authorized recipient (e.g., a customer) redistributing the information to others. For example, known systems distribute content in a form that is not freely readable, but rather is encrypted to be playable only on a particular device of a customer who has purchased the content. In this case, the content can be purchased and transported over a network, but the delivered file which contains the content will be playable only on the specified customer's device. If the customer forwards the file to others, or if the file is improperly intercepted, the content is unplayable in other devices.

An exemplary known method used to implement public/private key encryption of content, to protect against a customer distributing unauthorized copies, is shown in FIG. 1. After receiving a customer's public key, the vendor encrypts the content (e.g., digitized music) using the customer's public key in step 100 (for example, the public key of the customer's playback device). The encrypted content can be transmitted to the customer's playback device, for instance via the Internet, in step 102. The encrypted content can be transmitted to the playback device directly or stored on the customer's computer. In step 104, the playback device decrypts the content using an embedded private key (e.g., plays the digitized music), in a secure manner, such that the unencrypted content is not directly available to the customer to modify or forward as a user file. The encrypted data, even if stored on the customer's computer or a public network, cannot be used by the customer or others without the secure playback device which includes the private key.

Prior art systems require that the entire data file that comprises the content be encrypted every time a copy is purchased by a customer, as the public keys of each customer/device will be different. Additionally, on the customer's system, the entire data file is decrypted each time the content is accessed. When the number of uses by a given customer is to be limited, the computational burden is even greater because additional use limitation protocols are included in the encryption protocols.

For content that involves large data files, such as video on demand, 3D animations, high resolution images, high fidelity music, and the like, known systems place a large computational burden on the vendor's server. Additionally, known systems cannot take advantage of methods to alleviate network congestion, such as caching, the use of intermediate proxies, and the like, because each user downloads the file directly from the vendor's server.

SUMMARY OF THE INVENTION

The present invention is directed to methods and apparatus for partially encrypting an information file (e.g., data file of text and/or image information, or any data file containing any information), for secure delivery of content. An exemplary method comprises: dividing the information file into a first file and a second file, wherein the second file includes content from the information file to preclude reconstruction of the information file using only the first file; and encrypting the second file. Additionally, the method provides for transmitting the first file and the encrypted second file from a first device to a second device.

Alternate embodiments provide for receiving the first file and the encrypted second file, decrypting the second file, and combining the first file and the decrypted second file to reconstruct the information file.

An exemplary system for partially encrypting an information file for secure delivery comprises a server having logic that divides an information file into a first file and a second file, wherein the second file includes content from the information file to preclude reconstruction of the information file using only the first file. The server also includes logic that encrypts the second file. The system can include a device having logic that receives the first file and the encrypted second file, logic that decrypts the second file, and logic that combines the first file and the decrypted second file to reconstruct the information file. The system includes a communication path that operably interconnects the server and the device.

BRIEF DESCRIPTION OF THE DRAWINGS

The above features and advantages of the invention, and additional features and advantages of the invention, will be better appreciated from the following detailed description of the invention made with reference to the drawings, wherein.

DETAILED DESCRIPTION OF THE PREFERRED EMBODIMENTS

Figure 1:
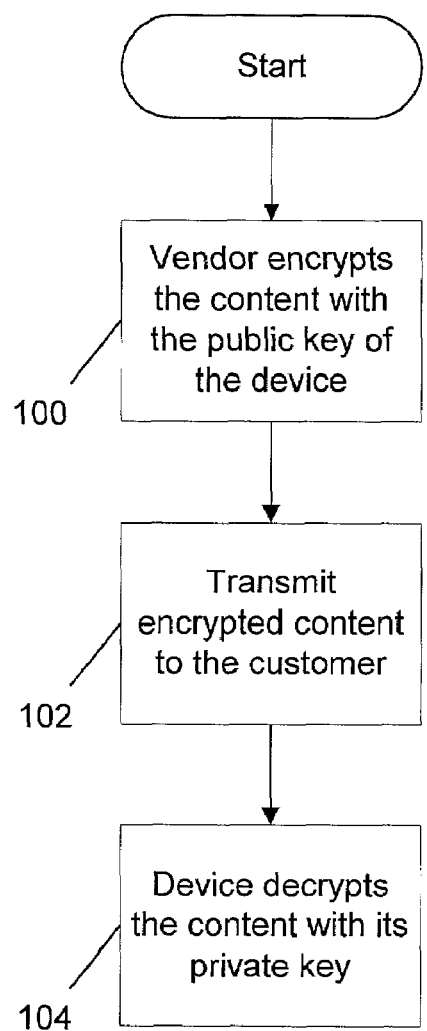
FIG. 1 illustrates a known method for transmission of content.
Figure 2:
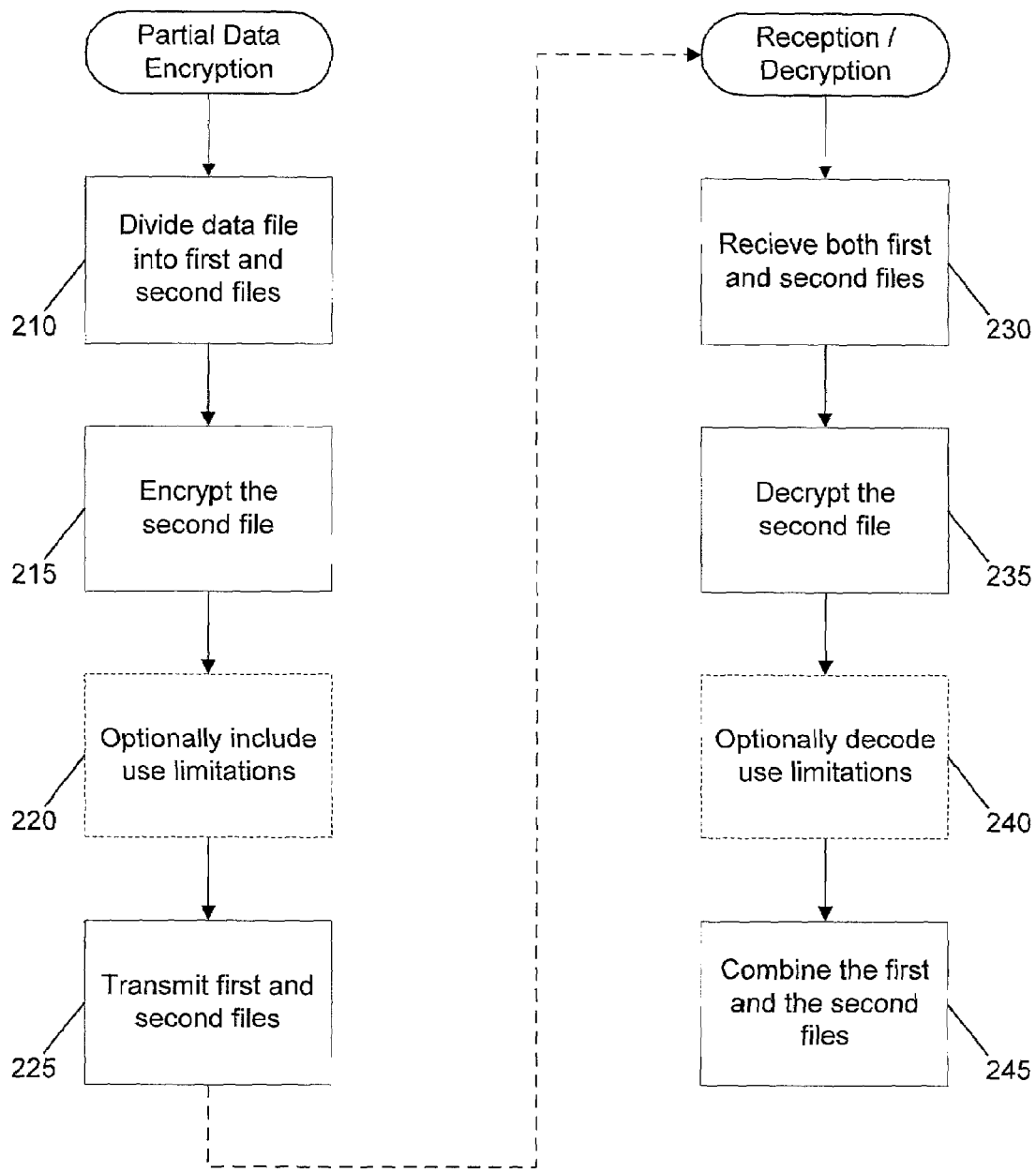
FIG. 2 shows a flow chart of an exemplary method of the present invention.

FIG. 2 shows a flow chart of an exemplary method of partially encrypting data for secure delivery of content in accordance with the present invention. In step 210, an information file (represented as a data file of text information, image information, audio information, video information or any combination thereof) is divided into a first file and a second file. The second file includes content from the information file to preclude reconstruction of the information file using only the first file.

As referenced herein, "reconstruction" means a reproduction of the original information by recombining the content of the first and second files, or by estimating or interpolating the content of the second file, for combination with the first file, or by acquiring the missing information of the second file from another source (such as a copy or forgery of the original). It will be appreciated by those skilled in the art that the amount and pattern of data removed from the information file to form the second file will vary depending on the exact content of the information file. In an exemplary embodiment, one to ten percent (or more or less) of the information file is sufficient to preclude accurate, reliable reconstruction of the information file, and can therefore be used to form the second file.

Of course it will be appreciated that the greater the amount of information extracted (up to, for example 50% of the information file), the more difficult it will be to reconstruct the information file using only the first file. It will also be appreciated that although a splitting of the information file into first and second files is discussed herein, the information file can be split into any number of files, any one or more of which can be encrypted using the same or different encryption.

In step 215, the second file is encrypted. For example, the second file is encrypted using any known public/private key encryption, or any desired encryption.

In step 220, additional use limitations can be optionally included with the encryption on the second file to, for example, prevent the file from being used more than an authorized number of times. Of course, any other desired information to be included with either or both the first file and the second file, such as additional information describing aspects of the data file.

The first file and the encrypted second file are then transmitted to a device in step 225, such as a secure device at the user's location. For instance, the first and second files can be transmitted via any wired or wireless communication path including, but not limited to, the Internet. Those skilled in the art will appreciate that any suitable communication path or combination of communication paths can be used to transmit the first file and the encrypted second file.

FIG. 2 illustrates an exemplary reception and decryption process. In step 230, an intended device receives both the first file and an encrypted second file. It will be appreciated by those skilled in the art that the files may be directly received by the device or via any number of intermediary devices. The second file is decrypted in step 235. In step 240, any included use limitations are decoded, and use of the information file is limited in accordance with the use limitations. The first file and the decrypted second file are combined to reconstruct a usable version of the information file in step 245. The reconstructed information file can then be used to output the content of the information file, such as by displaying an image, printing a copy of an image, playing digitized music, and the like.

Figure 3:
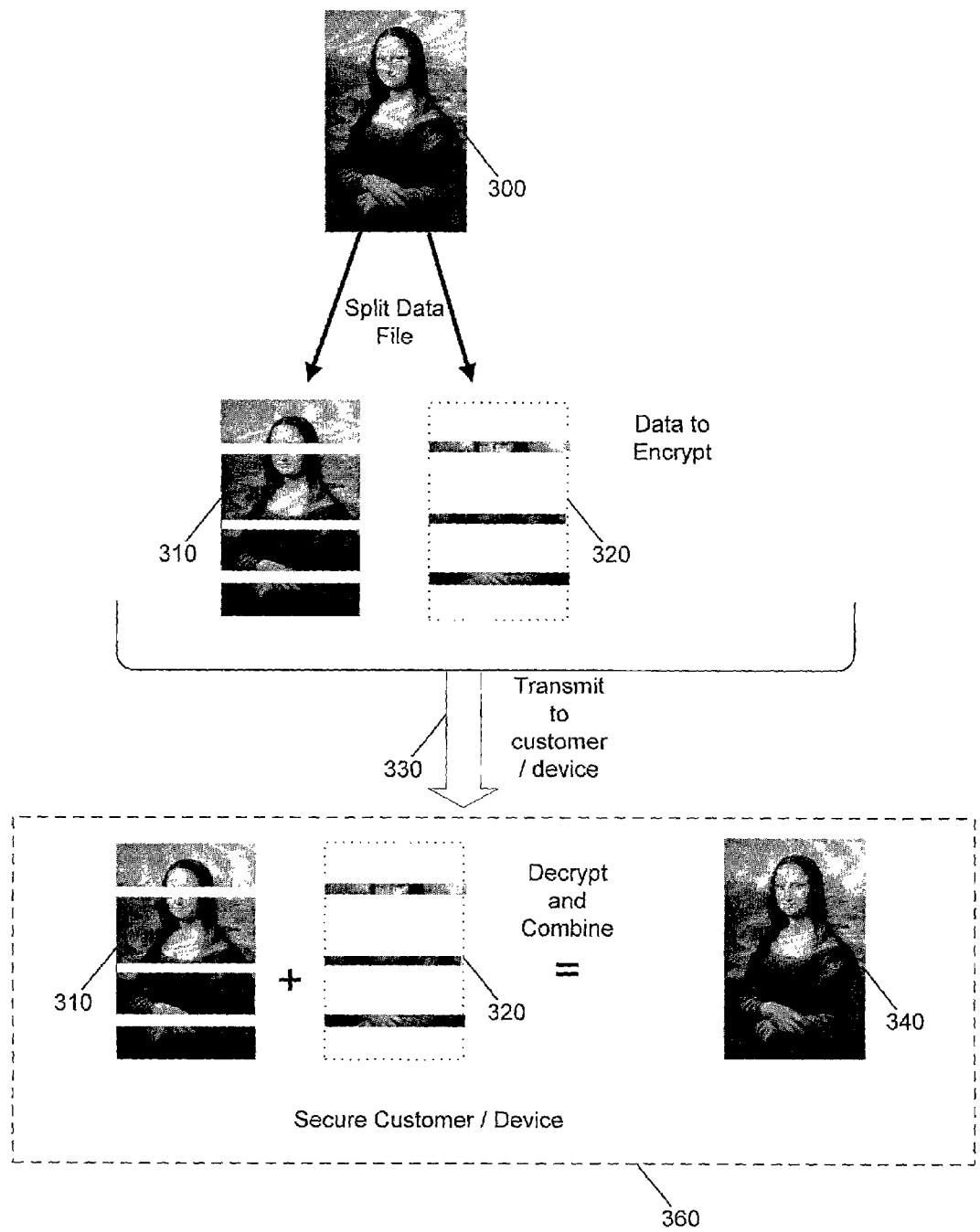
FIG. 3 illustrates an exemplary use of the invention with an image file.

Referring to FIG. 3, an exemplary information file, represented as an image file 300 which corresponds to a work of art, is shown. An owner of the work (e.g., an art vendor) can create such a file by scanning the original work of art or by creating the file as the original work, or by any other known method. In accordance with an exemplary embodiment of the present invention, the image file 300 can be transferred to a secure device (printer) 360 for producing high quality prints of the original image. The image file 300 is split into a first file 310 that remains unencrypted and a second file 320 that is encrypted using any desired encryption system (or into any desired number of files). Both the first file 310 and the second file 320 are transmitted to the secure device 360 via a communication path 330, such as the Internet. Upon receipt by the device 360, the second file 320 is decrypted by the device 360 and combined with the first file 310 to reconstruct a useable version of the original file 300 as a reconstructed image file 340. The reconstructed image file 340 can be used to produce a high quality print.

In this embodiment, the image file 340 is not available outside the secure device 360. Therefore, a copy of the image file 300 is not available for unauthorized copying by the owner of the device 360. The encryption/decryption process can include additional use limitations, such as limiting the number of prints that can be made from the reconstructed image file 340.

The division of the information file can be accomplished by any of different methods. For example, parts of the information file that form the second file can be selected by a user selected pattern or from a menu of predefined default patterns or in any other desired fashion. The default patterns can be related to the content contained in the data file. For example, a pattern, such as a stripe pattern can be used for an image file with the stripes used to select content of the second file being positioned to extract more complex portions of the image (such as portions which contain highly detailed areas of the original and/or a plurality of different colors). Alternately, a random pattern can be used for selecting the second file of, for example, an audio file or any other file. Each pattern can be related to a percentage of the information file the pattern will encompass. The specific pattern selected is not important, except that the pattern extract enough content to render the first file inadequate to sufficiently reconstruct the original information file using only the first file (i.e., to reconstruct the information file with a given degree of accuracy and reliability), and/or to render the content of the first file significantly reduced in value.

Figure 4:
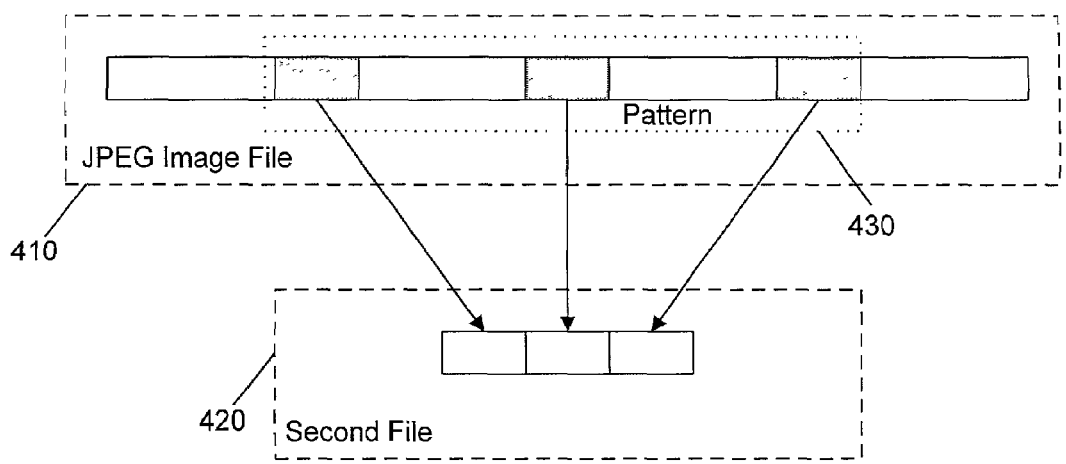
FIG. 4 illustrates splitting a data file according to one exemplary embodiment.

FIG. 4 shows an exemplary method for dividing a known information file into first and second files using a simple pattern. A JPEG image file 410, contains information representing a complete image in a known format. A pattern 430 can be applied to the image file 410 (e.g., as an overlay) to extract the content used to form the second file 420. The information not extracted by the pattern (e.g., the remaining data) is then used to form the first file. Another example of dividing a known file format using a predefined pattern is to extract a color map from a TIFF file. In still another example, key image fields and/or frames can be extracted from video or MPEG files. Of course, any number of extraction techniques for selecting the content to be included in the second file will be apparent to those skilled in the art.

To facilitate an understanding of the invention, many aspects of the invention are described in terms of sequences of actions to be performed by elements of a computer system. These various actions can be performed by specialized circuits (e.g., discrete logic and/or logic gates configured to perform a specialized function), by program instructions executed by one or more processors, or by any combination thereof. Moreover, the invention can be embodied entirely within any form of computer readable storage medium having stored therein an appropriate set of computer instructions that would cause a processor to carry out the techniques described herein.

Figure 5:
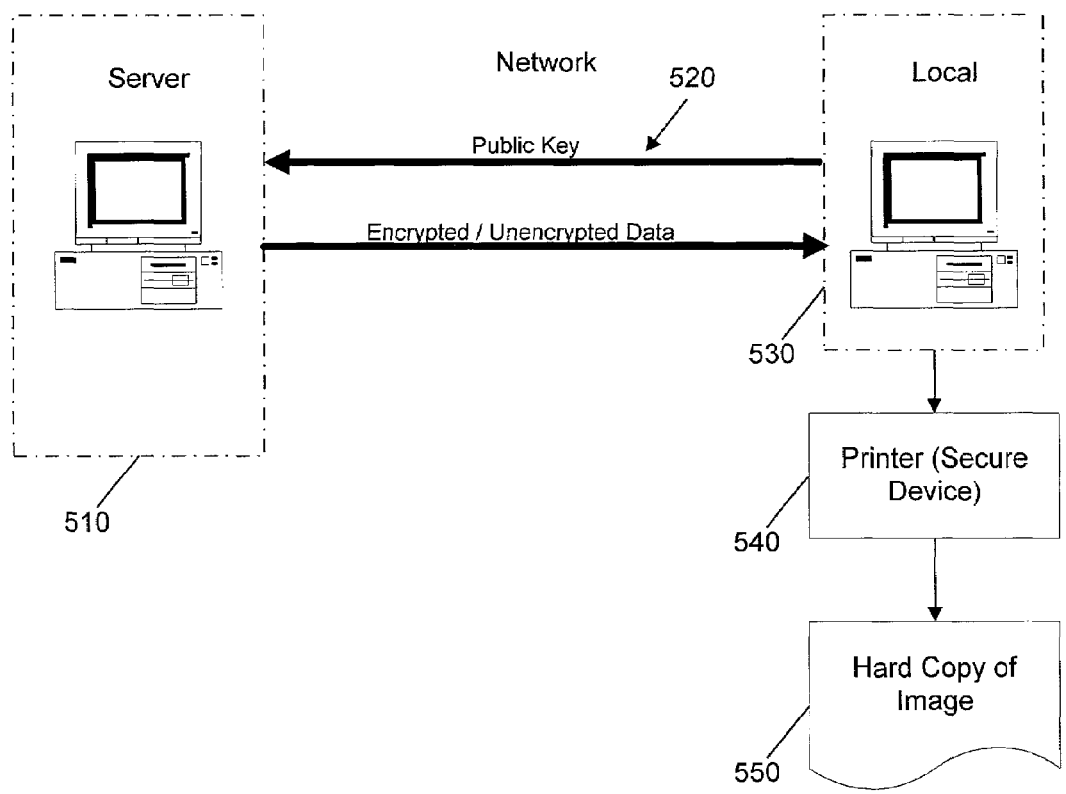
FIG. 5 illustrates an exemplary system configuration of the invention.

Referring to FIG. 5, a system for partially encrypting information for delivery is shown. A server 510 is configured with programming and/or logic that divides an information file into a first file and a second file. The second file includes content from the information file to preclude reconstruction of the information file using only the first file. The server can be any readily available computer. A network 520, such as the Internet, is used as a communication path that operably interconnects the server and a device such as a secure printing device. The network 520 can be connected to the server 510, and directly or indirectly connected to a device 540 via a local computer system 530 (e.g., any readily available computer). Using, for example a public/private key encryption system such as the aforementioned PGP encryption (e.g., employing Diffie-Hillman or RSA algorithms), the device 540 can transmit its public key via local computer system 530 and network 520 to server 510. The server 510 encrypts the second file using the device's public key, and an associated private key which is known in advance by the server, and also embedded in the secure device 540 (such that the private key is never transmitted over the network).

The first unencrypted file and the second encrypted file are then transmitted via the network 520. The device 540 receives the first file and the encrypted second file. The first and second file can be passed through or stored on local computer system 530. Once the first and second files are received, the device 540 decrypts the second file using, for example, internal logic and/or programmed instructions. With a public/private key encryption, the device 540 can decrypt the second file using its public key and an embedded private key. The device 540 then combines the first and second files to reconstruct a the information file. Again, this can be achieved using internal logic and/or programmed instructions. Where the device 540 is a printer, the reconstructed information file can be used to produce a hard copy of the image 550.

Additionally, the server can include logic and/or programming that adds information, such as use limitations, during, before or after encryption of the second file. Correspondingly, the device 540 can include logic and/or programming that decodes additional use limitations and that limits the use of the reconstructed information file in accordance with the use limitations. The server can also include logic and/or programming that selects parts from the information file that form the second file, such as a user defined pattern or a menu of predefined default patterns.

In accordance with the invention, only a fraction of the information file is encrypted to secure the content of the entire information file. Consequently, there are savings in computational resources at both the server and the end user device. Another advantage is the large unencrypted portion of the information file in the first file can take advantage of methods to alleviate network congestion, such as caching, the use of intermediate proxies, and the like, because that portion does not have to be downloaded directly from the vendor's server.

The foregoing has described principles, preferred embodiments and modes of operation of the invention. However, the invention is not limited to the particular embodiments discussed above. For example, the server can encompass multiple computer systems. For example, one computer system can be used to divide the information file and another computer can be used to encrypt the second file. Still another computer system can be used to transmit the first and second data files.

The communication path can be a wireless network, physical disk delivery, Internet, and the like, and/or various combinations of different communication paths. For instance, a large first file containing unencrypted data can be freely distributed by CD ROM, while the corresponding second file could be delivered via the Internet to be combined with the first file in the end user's device. Those skilled in the art will recognize many other combinations of components can be used to practice the invention.

The invention is not limited to image files and can be used for any data files, such as video on demand, 3D animations, digital video, digital audio, web pages, executable programs, data files and the like. Additionally, the end user device can be any computer system, printer, cable receiver, satellite receiver, video player, audio player, and other such digital appliances as will be appreciated by those skilled in the art.

Therefore, the above-described embodiments should be regarded as illustrative rather than restrictive, and it should be appreciated that variations may be made in those embodiments by those skilled in the art, without departing from the scope of the invention as defined by the following claims.

What is claimed is:

1. A computer implemented method of partially encrypting an information file for delivery of content comprising:
   dividing an information file into a first file and a second file, wherein the second file includes content from the information file to preclude reconstruction of the information file using only the first file, and wherein use limitations are included with the information file to prevent use of the second file to reconstruct the information file more than an authorized number of times; and
   encrypting the second file, wherein dividing the information file comprises:
   selecting parts from the information file via a user selected pattern.

2. The method of claim 1, further comprising:
   transmitting the first file and the encrypted second file to a device.

3. The method of claim 2, wherein the first file and the encrypted second file are transmitted via the Internet.

4. The method of claim 1, wherein the step of encrypting includes:
   using an RSA algorithm.

5. The method of claim 1, comprising:
   adding the use limitations to the second file.

6. The method of claim 1, wherein dividing the information file comprises:
   selecting parts from the information file via a default pattern related to content contained in the information file, to form the second file.

7. The method of claim 2, wherein the device is a printer which includes an embedded private key needed to decrypt the second file and print the information file.

8. A system for partially encrypting an information file for delivery comprising:
   a server that divides an information file into a first file and a second file, wherein the second file includes content from the information file to preclude reconstruction of the information file using only the first file, and that encrypts the second file, and wherein use limitations are included with the information file to prevent use of the second file to reconstruct the information file more than an authorized number of times;
   a device that receives the first file and the encrypted second file, that decrypts the second file, and that combines the first file and the decrypted second file to reconstruct a usable version of the information file; and a communication oath that operably interconnects the server and the device wherein the server comprises:

logic that includes the use limitations with encryption of the second file, wherein the server comprises:

logic that selects parts from the information file that form the second file via a user selected pattern.

9. The system of claim 8, wherein the communication path is the Internet.

10. The method of claim 8, wherein the second file is encrypted using a RSA algorithm.

11. The system of claim 8, wherein the server comprises:

logic that selects parts from the information file that form the second file via a default pattern related to the content contained in the information file.

12. The system of claim 8, wherein the device is at least one of a personal computer, a printer and a digital appliance.

13. The system of claim 8, wherein the device is a printer which includes an embedded private key needed to decrypt the second file and print the information file.

* * * * *